United States Patent
Ahn et al.

(10) Patent No.: US 8,160,356 B2
(45) Date of Patent: Apr. 17, 2012

(54) METHOD AND APPARATUS FOR CORRECTING PREFERRED COLOR AND LIQUID CRYSTAL DISPLAY DEVICE USING THE SAME

(75) Inventors: Ji Young Ahn, Gyeonggi-do (KR); Dong Woo Kang, Gyeonggi-do (KR); Choon Woo Kim, Seoul (KR); Kyoung Tae Kim, Incheon-si (KR)

(73) Assignee: LG Display Co., Ltd., Seoul (KR)

( * ) Notice: Subject to any disclaimer, the term of this patent is extended or adjusted under 35 U.S.C. 154(b) by 968 days.

(21) Appl. No.: 12/213,669

(22) Filed: Jun. 23, 2008

(65) Prior Publication Data
US 2008/0317340 A1    Dec. 25, 2008

(30) Foreign Application Priority Data
Jun. 25, 2007    (KR) .................. 10-2007-0061992

(51) Int. Cl.
*G06K 9/00*    (2006.01)
(52) U.S. Cl. ...................... 382/167; 358/520
(58) Field of Classification Search .......... 382/162–167; 358/518–540
See application file for complete search history.

(56) References Cited

U.S. PATENT DOCUMENTS

| | | | |
|---|---|---|---|
| 4,594,732 A * | 6/1986 | Tsuji ............................. | 382/174 |
| 7,187,386 B2 * | 3/2007 | Rice et al. ..................... | 345/589 |
| 2003/0053689 A1 * | 3/2003 | Watanabe et al. ............. | 382/167 |
| 2004/0100478 A1 * | 5/2004 | Bianchi et al. ................ | 345/690 |
| 2005/0280848 A1 * | 12/2005 | Seko ............................. | 358/1.9 |
| 2006/0203269 A1 * | 9/2006 | Murayama .................... | 358/1.9 |
| 2007/0230780 A1 * | 10/2007 | Chen et al. .................... | 382/167 |
| 2008/0240552 A1 * | 10/2008 | Wang et al. ................... | 382/162 |
| 2009/0046171 A1 * | 2/2009 | Kogan et al. ............... | 348/223.1 |

* cited by examiner

*Primary Examiner* — Jingge Wu
(74) *Attorney, Agent, or Firm* — Morgan, Lewis & Bockius LLP

(57) ABSTRACT

A method and apparatus for correcting a preferred color, which is capable of correcting the preferred color in consideration of an input image and the visual characteristics of a person by correcting differences between colors preferred by the person and an average color coordinate of a color to be corrected in the input image, and a liquid crystal display device using the same are disclosed. The method for correcting a preferred color includes converting data of an input image into lightness (L), chroma (C) and hue (H) data, detecting a preferred-color pixel from the input image, calculating average values of the L, C and H data of the preferred-color pixel, correcting the C and H data of the preferred-color pixel according to differences between the average values of the C and H data and reference values of the C and H data, correcting the L data of the preferred-color pixel according to the average value of the L data according to the hue of the preferred-color pixel, and inversely converting the corrected L, C and H data into image data.

15 Claims, 6 Drawing Sheets

METHOD AND APPARATUS FOR CORRECTING PREFERRED COLOR AND LIQUID CRYSTAL DISPLAY DEVICE USING THE SAME

This application claims the benefit of Korean Patent Application No. P2007-0061992, filed on Jun. 25, 2007, which is hereby incorporated by reference as if fully set forth herein.

BACKGROUND OF THE INVENTION

1. Field of the Invention

The present invention relates to a display device, and more particularly, to a method and apparatus for correcting a preferred color, which is capable of correcting a color of an input image to a color preferred by a person so as to improve image quality, and a liquid crystal display device using the same.

2. Discussion of the Related Art

High resolution and high definition of an image display device has been realized according to user's requirements. Most users determine the definition of an image on the basis of a preferred color displayed on a display device, such as a skin color, a green color or a blue color. This is because the preferred color is stored in a color storage space of a person so as to have a significant influence on color perception. Accordingly, the image display device uses a preferred color correcting method for detecting a preferred-color area from an input image and converting the detected preferred-color area into a color preferred by the user, in order to display a high-definition image preferred by a user. In the method for correcting the preferred color, the preferred-color area should be accurately detected such that other color areas are not included, and should be corrected to the color preferred by the person.

As a conventional preferred color correcting method, an area correcting method for deciding an input color area and a preferred-color area in an elliptical shape in a u'v' chromaticity coordinate and mapping the input color area to the preferred-color area ("Preferred Skin Color Reproduction Based on Adaptive Affine Transform", IEEE Transactions on Consumer Electronics, Vol. 51, No. 1, pp 191-197, 2005) and a point correcting method for setting one point of a color space as a target and positioning an input color to be close to the target ("Skin color reproduction algorithm for portrait images shown on the mobile display", SPIE vol. 6058, pp 1-8) were reported.

However, the area correcting method is disadvantageous in that contour noise occurs and luminance deteriorates because brightness is not corrected. In addition, the point correcting method is disadvantageous in that preferred color correction capability deteriorates because the contents of the input image are not considered.

SUMMARY OF THE INVENTION

Accordingly, the present invention is directed to a method and apparatus for correcting a preferred color and a liquid crystal display device using the same that substantially obviate one or more problems due to limitations and disadvantages of the related art.

An object of the present invention is to provide a method and apparatus for correcting a preferred color, which is capable of correcting the preferred color in consideration of an input image and the visual characteristics of a person by correcting differences between a color preferred by the person and an average color coordinate of a color to be corrected in the input image, and a liquid crystal display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for correcting a preferred color includes converting data of an input image into lightness (L), chroma (C) and hue (H) data; detecting a preferred-color pixel from the input image; calculating average values of the L, C and H data of the preferred-color pixel; correcting the C and H data of the preferred-color pixel according to differences between the average values of the C and H data and reference values of the C and H data; correcting the L data of the preferred-color pixel according to the average value of the L data according to the hue of the preferred-color pixel; and inversely converting the corrected L, C and H data into image data.

The detecting of the preferred-color pixel may include comparing the H data of the input pixel with a reference range of the H data of the preferred color and detecting a first preferred-color pixel; and performing a best linear estimation (BLE) operation of the first preferred-color pixel and detecting a second preferred-color pixel.

The detecting of the second preferred-color pixel may include calculating a preferred-color discrimination constant by a matrix product of an input matrix composed of characteristic data of the first preferred-color pixel and a weight vector matrix composed of weight vectors of the preferred color; and comparing the calculated preferred-color discrimination constant with a reference range of the preferred-color discrimination constant and detecting the second preferred-color pixel.

The correcting of the C and H data may include calculating a correction function for compensating for the differences between the average values of the C and H data and the reference values of the C and H data; calculating a weighting function for adjusting peak values of the average values of the C and H data; multiplying the correction function by the weighting function and calculating a final correction function; calculating correction amounts of the C and H data using the final correction function; and compensating for the C and H data by the correction amounts.

The correcting of the L data may be performed only if the preferred-color pixel is a skin-color pixel. The correcting of the L data of the skin-color pixel may include calculating an L correction function according to the average value of the L data of the skin-color pixel; calculating an L correction amount according to the L data using the L correction function; compensating for the L data of the skin-color pixel by the L correction amount; and compensating for the L data of all pixels of the input image by the L correction amount of the skin-color pixel.

The method may further include calculating a secondary weighting function for decreasing the correction amount in a boundary of the preferred-color pixel using the preferred-color discrimination constant of the second preferred-color pixel used in the detecting of the preferred-color pixel; and multiplying the secondary weighting function by the final correction function.

In another aspect of the present invention, an apparatus for correcting a preferred color includes a color coordinate converter which converts data of an input image into lightness (L), chroma (C) and hue (H) data; a preferred-color detector which detects a preferred-color pixel from the input image; an LCH average value calculator which calculates average values of the L, C and H data of the preferred-color pixel from the preferred-color detector; a preferred-color corrector which corrects the C and H data of the preferred-color pixel according to differences between the average values of the C and H data and reference values of the C and H data and corrects the L data of the preferred-color pixel according to the average value of the L data according to the hue of the preferred-color pixel; and a color coordinate inverse-converter which inversely converts the corrected L, C and H data from the preferred-color corrector into image data.

In another aspect of the present invention, a liquid crystal display device includes the apparatus for correcting the preferred color.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, exemplary embodiments of the present invention will be described in detail with reference to FIGS. 1 to 8.

Figure 1:
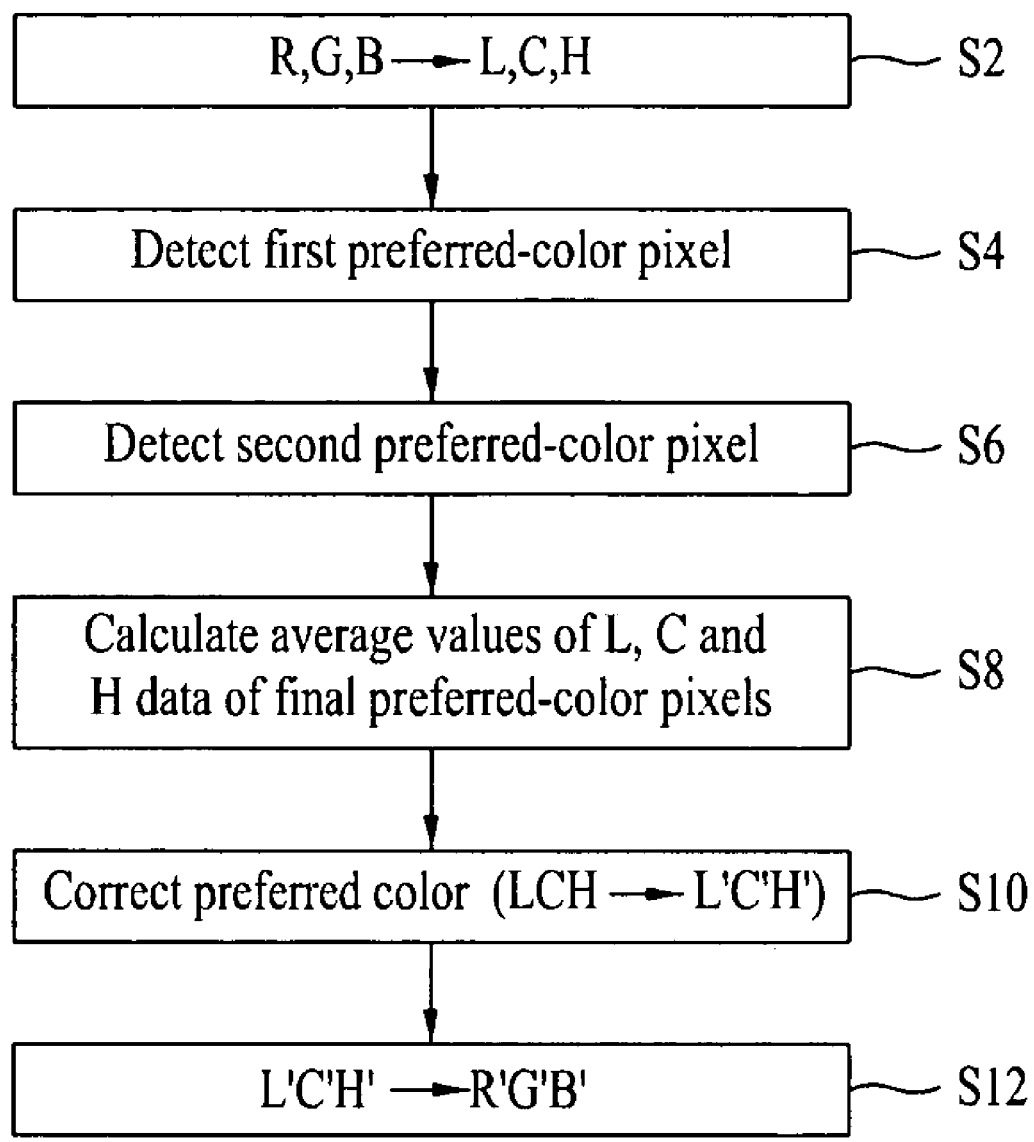
FIG. 1 is a flowchart illustrating a method for correcting a preferred color according to an embodiment of the present invention.

FIG. 1 is a flowchart illustrating a method for correcting a preferred color according to an embodiment of the present invention;

In a step 2 (S2), RGB data of an input pixel is converted into LCH data. In more detail, the RGB data of the input pixel is converted into an XYZ color coordinate using the characteristics of a liquid crystal display device, for example, a matrix which compensates for a black error component due to a backlight and has gamma characteristics, and the XYZ color coordinate is converted into a Lab color coordinate. In the Lab color coordinate, an "L" component indicates lightness, an "a" component indicates a red-green color difference component, and a "b" component indicates a yellow-blue color difference component. The RGB data may be converted into the Lab data by a mapping method using a lookup table. Chroma data (hereinafter, referred to as "C data") representing the chroma of a color is calculated as expressed by Equation 1 and hue data (hereinafter, referred to as "H data") representing an angle for discriminating the hue is calculated as expressed by Equation 2, using the color difference data a and b.

$$C = \sqrt{a^2 + b^2} \qquad \text{Equation 1}$$

$$H = \tan^{-1}\frac{b}{a} \qquad \text{Equation 2}$$

In a step 4 (S4), the H data of the input pixel is compared with an H range of each preferred color so as to detect a first preferred-color pixel. The H range of each preferred color is previously set using a color distribution of a sample image in each preferred-color category. For example, the H range of a skin color is set to $11° \leq H \leq 79°$, the H range of a green color is set to $79° \leq H \leq 186°$, and the H range of a blue color is set to $200° \leq H \leq 315°$. The H data of the input pixel is compared with the H range of the skin color, the H range of the green color and the H range of the blue color so as to detect the first preferred-color pixel corresponding to each preferred color. At this time, if the H data of the input pixel does not belong to any one of the H ranges of the preferred colors, the input pixel is detected as a non-preferred-color pixel.

In a step 6 (S6), a best linear estimation (hereinafter, referred to as "BLE") operation of the first preferred-color pixel detected in the step S4 is performed so as to calculate a preferred-color discrimination constant, and the calculated preferred-color discrimination constant is compared with a reference range of the discrimination constant so as to detect a second preferred-color pixel. First, a matrix product of characteristic data L, a, b, C, H, R, G and B of the first preferred-color pixel and a weight vector matrix composed of weight vectors w0 to w7 of each preferred color so as to calculate the preferred-color discrimination constant. Then, the calculated preferred-color discrimination constant is compared with the reference range of the preferred-color discrimination constant and the input pixel is detected as the second preferred-color pixel if the preferred-color discrimination constant belongs to the reference range. Here, the weight vector matrix is previously set by training a preferred-color image sample and a non-preferred-color image sample by the BLE method, and includes a skin-color weight vector matrix, a green-color weight vector matrix and a blue-color vector matrix. The reference range of the preferred-color discrimination constant is previously set using the preferred-color discrimination constant calculated by the matrix product of the preferred-color sample and the weight vector matrix. The reference range of the preferred-color discrimination constant may be set as shown in Table 1.

TABLE 1

| | Preferred color | | |
|---|---|---|---|
| | Skin color | Green color | Blue color |
| Reference range of preferred-color discrimination constant | 0.5 < ds < 1.5 | 0.6 < dg < 1.4 | 0.6 < db < 1.4 |

For example, if the skin-color pixel is detected as the first preferred-color pixel in the step S4, the matrix product of the characteristic data of the pixel and the skin-color weight vector matrix is performed so as to calculate the skin-color discrimination constant and the calculated skin-color discrimination constant is compared with the reference range of the skin-color discrimination constant so as to finally discriminate the skin color. At this time, the pixel is detected as the preferred-color pixel if the calculated skin-color discrimination constant belongs to the reference range of the skin-color discrimination constant and is detected as the non-preferred-color pixel if the calculated skin-color discrimination constant does not belong to the reference range of the skin-color discrimination constant.

In a step 8 (S8), average values of L, C and H data of the pixels which are finally detected as the preferred-color pixels in the step S6 are calculated. In a step 10 (S10), a correction function according to differences between the average values and the reference values of L, C and H data is calculated and the L, C and H data of the input pixel is corrected according to the correction function, thereby correcting the preferred color. The reference values of the L, C and H data are values of colors preferred by persons, which are set by experiments, as shown in Table 2, and may be changed by a designer or a user. The detailed description of the step S10 of correcting the preferred color will be described later.

TABLE 2

| | L | C | H |
|---|---|---|---|
| Skin color | +6 | 44 | 65° (11° to 79°) |
| Green color | 0 | 77 | 132° (79° to 186°) |
| Blue color | 0 | 59 | 276° (200° to 315°) |

Next, L', C' and H' data of which the preferred color is corrected is inversely converted into R', G' and B' data in a step 12 (S12). The L', C' and H' data of which the preferred color is corrected is inversely converted into L', a' and b' data and the L', a' and b' data is inversely converted into R', G' and B' data.

Figure 2:
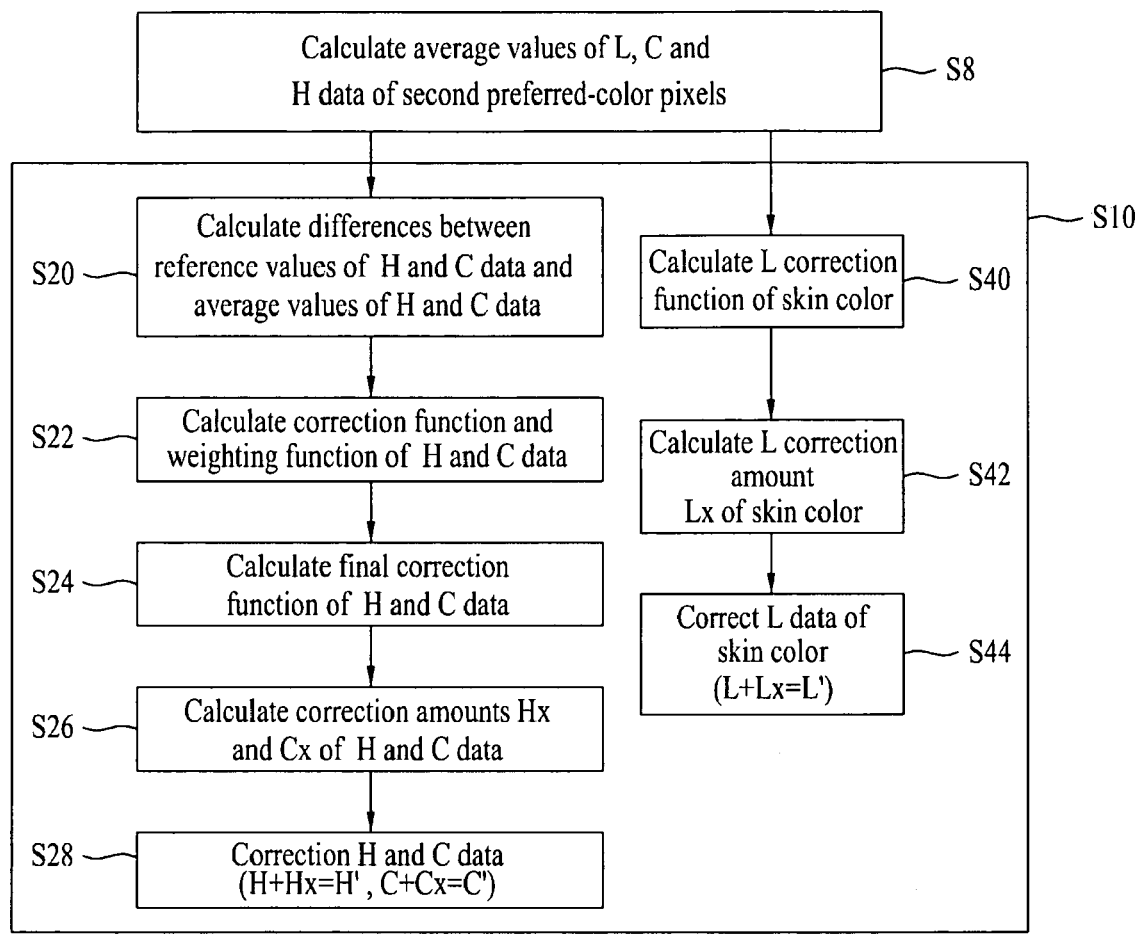
FIG. 2 is a flowchart illustrating in detail a step of correcting the preferred color shown in FIG. 1.
Figure 3:
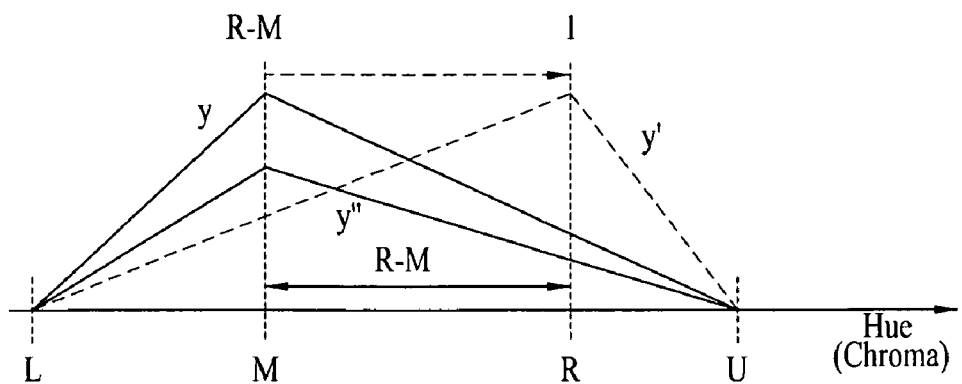
FIG. 3 is a graph showing a correction function and a first weighting function of hue and chroma according to the present invention.

FIG. 2 is a flowchart illustrating in detail the step S10 of correcting the preferred color shown in FIG. 1. FIG. 3 is a graph showing the correction function and the weighting function of the H and C data according to the present invention.

In the step S10 of correcting the preferred color, the C and H data of the preferred-color pixel are corrected. Here, the C and H data is corrected. The L data which is the lightness component is further corrected if the preferred-color pixel is the skin-color pixel.

In a step 20 (S20), the difference between the reference value and the average value of the C data and the difference between reference value and the average value of the C data of the preferred color of the preferred-color pixels detected in the step S6 are calculated. The reference values of the C and H data of the preferred color are obtained by previously setting the C and H data of the color, which is most preferred by persons, in each preferred-color category as shown in Table 2. The average values of the C and H data of the preferred color are obtained by calculating the average values of the C and H data of the final preferred-color pixels in the unit of a frame and thus are updated in the unit of a frame. Since adjacent frames are mostly similar to each other, the average values of the C and H data of the preferred-color pixels of a previous frame may be used as the average values of the C and H data of the preferred color. The differences between the reference values and the average values of the C and H data of the preferred color are calculated in the unit of a frame.

In a step 22 (S22), the correction function y and the weighting function y' of the C and H data are calculated using the difference between the reference value and the average value of the C data of the preferred color and the difference between the reference value and the average value of the H data of the preferred color as shown in FIG. 3. In a step 24 (S24), a final correction function y" of the C and H data is calculated by a product of the correction function y and the weighting function y'.

The correction function y shifts the average value M of the H(C) data of the input image to the reference value R. The correction function y varies depending on whether the H(C) data of the input pixel is greater or less than the average value M of the H(C) data. In the correction function y, the H(C) data is distant from the average value M, the correction amount is decreased. The first weighting function y' is used to adjust a peak value R−M of the average value M of the H(C) data. In other words, as the average value M of the H(C) data is distant from the reference value R, the peak value R-M is increased. In this case, contour noise is increased in a pixel boundary. In order to prevent the contour noise, as shown in FIG. 3, the first weighting function y' for decreasing the peak value R−M of the average value M of the C or H data is used. In the first weighting function y', the peak value of the reference value R of the H(C) data is set to 1 and the correction amount is decreased as the H(C) data is distant from the reference value R. Referring to FIG. 3, the correction function y, the weighting function y' and the final correction function y" of the H(C) data are, for example, expressed by Equations 3 to 5.

$$y = \frac{(R-M)-0}{M-L} \times (x-L) \qquad \text{Equation 3}$$

$$y' = \frac{1}{R-L} \times (x'-L) \qquad \text{Equation 4}$$

$$y'' = y \times y' \qquad \text{Equation 5}$$

In the above-described equations and FIG. 3, R denotes the reference value of the H(C) data of each preferred color, M and x' denote the average values of the H(C) data of each preferred color, x denotes the H(C) data of the preferred-color pixel, L denotes a lower limit value of the H(C) range of each preferred color, and U denotes an upper limit value of the H(C) range of each preferred color. The final correction function y" of the H(C) data is calculated by a product of the correction function y and the weighting function y' as expressed by Equation 5.

Figure 4:
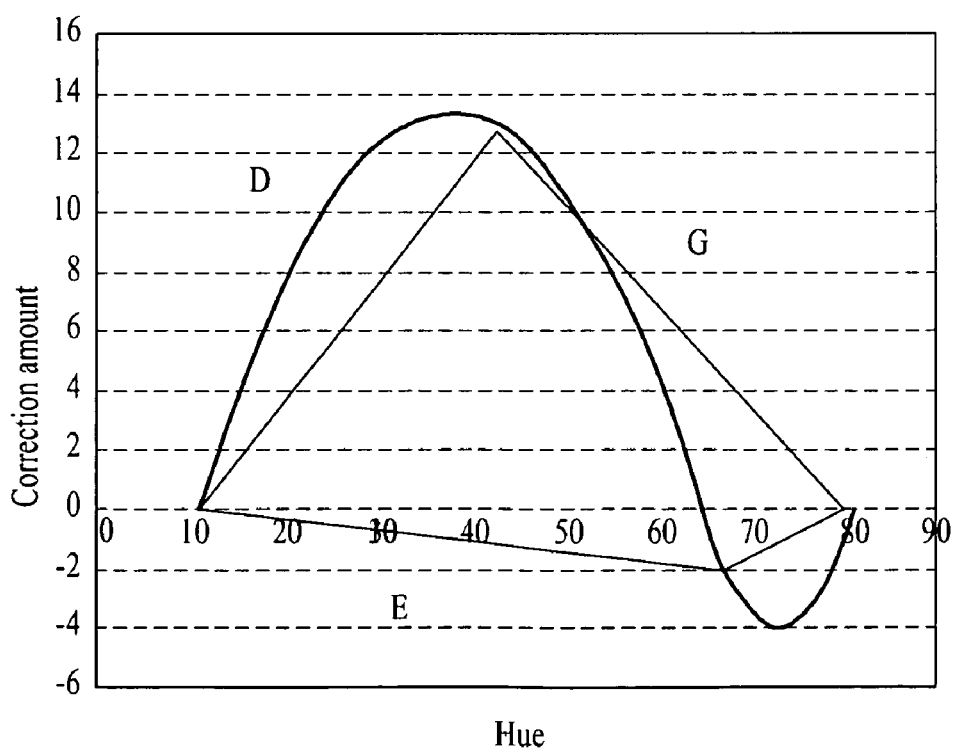
FIG. 4 is a graph showing a correction function according to the trace of a peak value of an average value of the hue according to the present invention.

FIG. 4 shows the final correction function y" of the H data. A curved line D shows the trace of the peak value of the average value of the H data and a line G shows the final correction function y" when the average value 43 of the H data of the input image is less than the reference value 65 of the H data and a positive correction amount is calculated according to the input H. A line E shows a function when the average value 67 of the H data of the input image is greater than the reference value 65 of the H data and a negative correction amount is calculated according to the input H data. Accordingly, in the final correction function y'', if the average value of the H(C) data of the input image is less than the reference value of the H(C) data, the positive H(C) correction amount is added to all the preferred-color pixels such that the average value of the H(C) data of the input image is corrected to be close to the reference value of the H(C) data and, if the average value of the H(C) data of the input image is greater than the reference value of the H(C) data, the negative H(C) correction amount is added to all the preferred-color pixels, that is, the H(C) correction amount is subtracted from all the preferred-color pixels, such that the average value of the H(C) data of the input image is close to the reference value of the H(C) data.

In a step 24 (S24), the H and C data of the input pixel is input to the final correction function y'' so as to calculate H and C correction amounts Hx and Cx according to the H and C data of the input pixel. In a step 26 (S26), the H and C correction amounts Hx and Cx are added to the H and C data of the input pixel so as to correct the H and C data of the input pixel and output the corrected H' and C' data.

If the preferred-color pixel is the skin-color pixel, steps 40 (S40) to 46 (S44) are performed such that the L data of the input pixel is further corrected. If the preferred-color pixel is the green-color pixel or blue-color pixel, the L data is not corrected.

Figure 5:
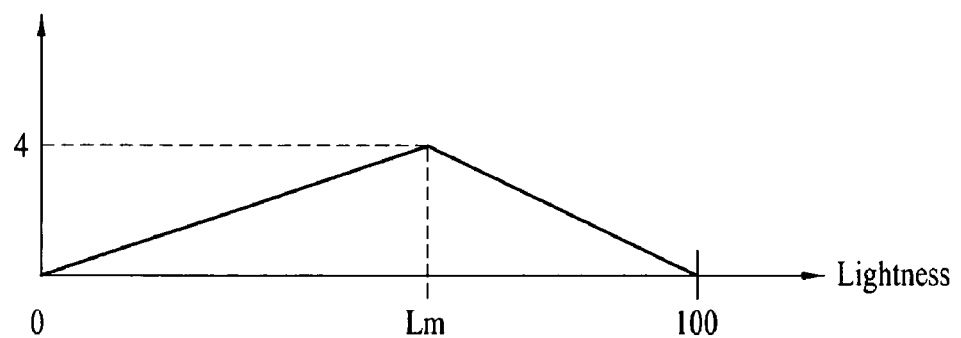
FIG. 5 is a graph showing a lightness correction function according to the present invention.

In a step 40 (S40), an L average value (Lm) of the skin-color pixel is calculated in the unit of a frame. Since adjacent frames are similar to each other, the L average value Lm of the skin-color pixels of a previous frame is calculated. And, an L correction function of the skin color is calculated using the L average value, as shown in FIG. 5. Referring to FIG. 5, in the L correction function, it can be seen that the L correction amount is decreased as the L data is distant from the L average value Lm.

In a step 42 (S42), the L data of the skin-color pixel is input to the L correction function so as to calculate an L correction amount Lx according to the L data of the skin-color pixel.

In a step 44 (S44), the L correction amount Lx is added to the L data of the skin-color pixel so as to the correct the L data of the skin-color pixel and output the corrected L' data. If only the L data of the skin-color pixel is corrected, only the skin-color pixel brightens and thus contour noise may occur. Thus, the L data of the overall image, that is, all the pixels, is corrected by the L correction amount Lx of the skin-color pixel.

In the method for correcting the preferred color according to the present invention, the differences between the color coordinate average values of the preferred-color pixels and the reference values of the colors preferred by the person are corrected so as to correct the preferred colors. Accordingly, the preferred colors of the input images are corrected in consideration of the visible characteristics of the person and the average values of the input image such that image quality can be improved with the colors preferred by the user. In addition, in the method for correcting the preferred color according to the present invention, the average values of the input image are corrected to be close to the reference values of the preferred colors using the weighting function such that contour error can be prevented from occurring in a pixel boundary.

Meanwhile, in the step 6 (S6) shown in FIG. 1, contour noise may occur due to the correction of the preferred-color pixel in the boundary between the preferred-color pixel and the non-preferred-color pixel which are detected using the BLE method. In other words, although the characteristic data L, a, b, C, H, R, G and B of the adjacent pixels are similar to each other, the preferred-color discrimination constants thereof may be different from each other due to the matrix product with the weight vector. One of the adjacent pixels is detected as the preferred-color pixel and the other of adjacent pixels is detected as the non-preferred-color pixel due to the difference between the preferred-color discrimination constants and the preferred-color pixel is corrected, the contour noise may occur in the boundary between the preferred-color pixel and the non-preferred-color pixel due to the correction amount of the preferred-color pixel. In order to prevent the contour noise, in the step 22 (S22) of FIG. 2, the correction function y and the weighting function y' of the H(C) data are calculated and the second weighting function y'' using the preferred-color discrimination constant is further calculated and, in the step 24 (S24), the final correction function y'' is calculated by a product of the correction function y, the first weighting function y' and the second weighting function y2'.

$$y''=y \times y' \times y2' \qquad \text{Equation 6}$$

Figure 6:
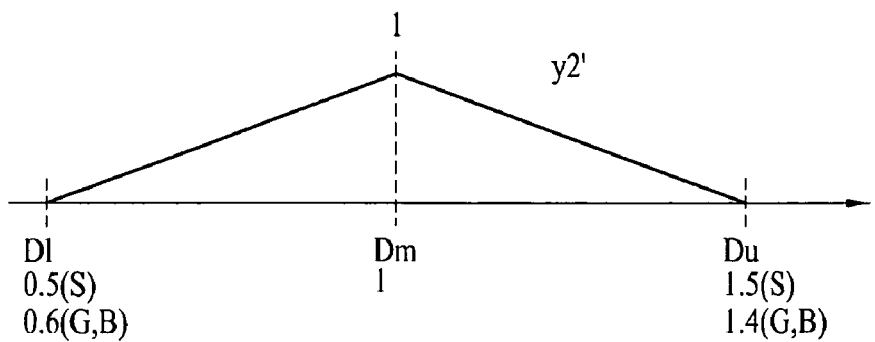
FIG. 6 is a graph showing a second weighting function according to the present invention.

FIG. 6 is a graph showing the second weighting function y2' of the H(C) data according to a preferred-color discrimination constant D. In the second weighting function y2' of the H(C) data, the correction amount of the H(C) data is decreased as the constant is distant from 1 which is a medium value of a preferred-color discrimination constant range D1 to Du. In other words, in the second weighting function y2' of the H(C) data, if the preferred color is detected using the preferred-color discrimination constant, the H(C) correction amount of the preferred-color pixel located at the boundary adjacent to the non-preferred-color pixel is decreased. Accordingly, it is possible to prevent the contour noise from occurring in the boundary between the preferred-color pixel and the non-preferred-color pixel. For example, it is possible to prevent the contour noise from occurring in the boundary between a skin-color area and a non-skin-color area, when the second weighting function is used.

Figure 7:
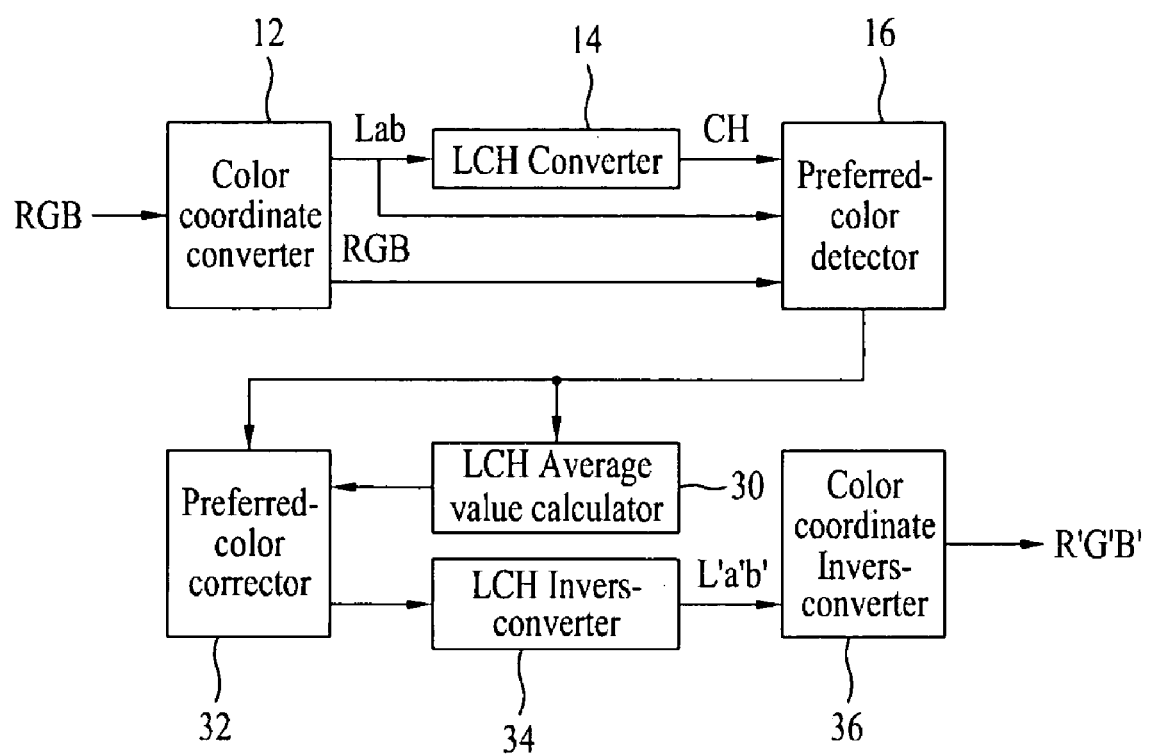
FIG. 7 is a block diagram showing an apparatus for correcting a preferred color according to an embodiment of the present invention.

FIG. 7 is a block diagram showing an apparatus for correcting a preferred color according to an embodiment of the present invention.

The apparatus for correcting the preferred color shown in FIG. 7 includes a color coordinate converter 12 for converting input R, G and B data into a Lab color coordinate, an LCH converter 14 for converting L, a, and b data from the color coordinate converter 12 into L, C and H data, a preferred-color detector 16 for detecting a first preferred-color pixel using the H data from the LCH converter 14 and detecting a second preferred-color pixel using the BLE operation of the first preferred-color pixel, an LCH average value calculator 30 for calculating the average values of the L, C and H data of the second preferred-color pixel from the preferred-color detector 16, a preferred-color corrector 32 for correcting the second preferred-color pixel using the differences between the average values and the reference values of the L, C and H data of the preferred color, an LCH inverse-converter 34 for inversely converting the L', C' and H' data from the preferred-color corrector 32 into L', a' and b' data, and a color coordinate inverse-converter 36 for inversely converting the L', a' and b' data from the LCH inverse-converter 34 into R', G' and B' data.

The color coordinate converter 12 converts the input R, G and B data into the L, a and b data by the lookup table and outputs the converted L, a and b data.

The LCH converter 14 calculates the C and H data of the pixel using the a and b color difference data as expressed by Equations 1 and 2, converts the input L, a and b data into the L, C and H data, and outputs the converted L, C and H data.

The preferred-color detector 16 compares the H data from the LCH converter 14 with the H range of each preferred color so as to detect the first preferred-color pixel and performs the BLE operation of the first preferred-color pixel so as to detect the second preferred-color pixel. The H range of each preferred color is previously set using the color distribution of a sample image in each preferred-color category and is stored in a memory (not shown). The preferred-color detector 16 compares the H data of the input pixel with the H range of the skin color, the H range of the green color and the H range of the blue color and detects the first preferred-color pixel of each preferred color. In addition, the preferred-color detector 16 performs the BLE operation of the first preferred-color pixel so as to calculate the preferred-color discrimination constant and compares the calculated preferred-color discrimination constant with the reference range of the discrimination constant so as to detect the second preferred-color pixel. The preferred-color detector 16 performs the matrix product of the characteristic data L, a, b, C, H, R, G and B of the first preferred-color pixel received from the color coordinate converter 12 and the LCH converter 14 and the weight vector matrix composed of weight vectors w0 to w7 of the preferred color so as to calculate the preferred-color discrimination constant. Then, the calculated preferred-color discrimination constant is compared with the reference range of the preferred-color discrimination constant and the pixel is detected as the second preferred-color pixel if the preferred-color discrimination constant belongs to the reference range. Here, the weight vector matrix and the reference range of the preferred-color discrimination constant are previously set in each preferred-color category and are stored in a memory (not shown).

The LCH average value calculator 30 calculates the average values of the L, C and H data of the final preferred-color pixels, which are detected as the second preferred-color pixels by the preferred-color detector 16, in the unit of a frame and updates the average values. The LCH average value calculator 30 may calculate and output the average values of the L, C and H data of a previous frame.

The preferred-color corrector 32 calculates the correction function and the weighting function according to the differences between the average values from the LCH average calculator 30 and the reference values of the C and H data, multiplies the correction function by the weighting function so as to calculate the final correction function, calculates the correction amounts of the C and H data according to the final correction function, and adds the calculated correction amounts to the input C and H data so as to correct the C and H data. The reference values of the L, C and H data are previously set and are stored in a memory (not shown). The preferred-color corrector 32 calculates the correction function according to the average value of the L data and corrects the input L data according to the correction function, if the preferred-color pixel detected by the preferred-color detector 16 is the skin-color pixel. At this time, in order to prevent the contour noise due to the correction of only the L data of the skin-color pixel, the L component of the overall image is corrected by the L correction amount of the skin-color pixel. Meanwhile, in order to prevent the contour noise due to the correction of the C and H data, the preferred-color corrector 32 may calculate the final correction function by multiplying the correction function and the weighting function by the second weighting function using the preferred-color discrimination constant.

The LCH inverse-converter 34 inversely converts the L', C' and H' data from the preferred-color corrector 32 into the L', a' and b' data and outputs the converted L', a' and b' data.

The color coordinate inverse-converter 36 inversely converts the L', a' and b' data into R', G' and B' data.

In the apparatus for correcting the preferred color according to the present invention, the preferred colors are corrected according to the differences between the color coordinate average values of the preferred-color pixels and the reference values of the colors preferred by the person so as to improve image quality with the colors preferred by the user. In addition, in the method for correcting the preferred color according to the present invention, the average values of the input image are corrected to be close to the reference values of the preferred colors using the weighting function such that contour error can be prevented from occurring in a pixel boundary.

Figure 8:
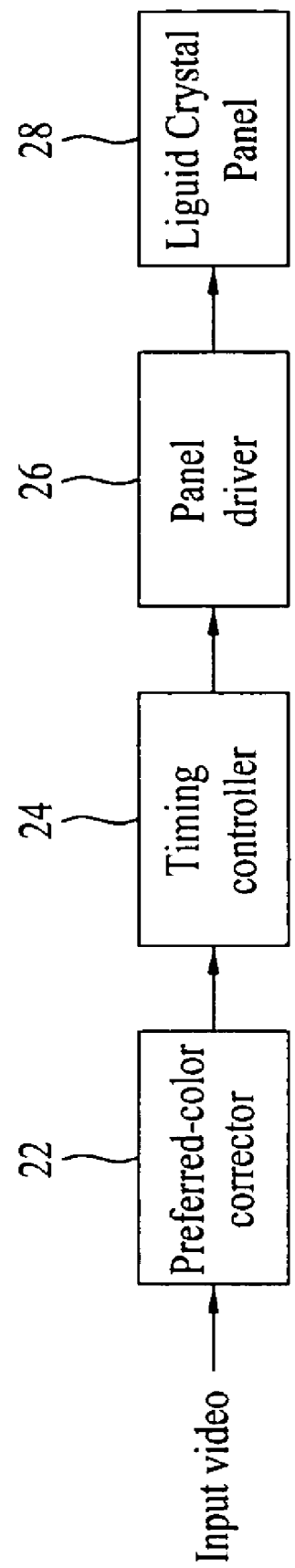
FIG. 8 is a block diagram showing a liquid crystal display device using a preferred-color corrector according to an embodiment of the present invention.

FIG. 8 is a block diagram showing a liquid crystal display device using a preferred color correcting unit according to an embodiment of the present invention.

The liquid crystal display device shown in FIG. 8 includes a preferred-color corrector 22, a timing controller 24, a panel driver 26 and a liquid crystal panel 28.

The preferred-color correcting unit 22 accurately detects the preferred-color pixels through a dual preferred-color detecting method and corrects the preferred colors of the detected preferred-color pixels. The correction of the preferred colors is performed by correcting the C and H data of the preferred-color pixel using the correction function and the weighting function according to the differences between the average values of the C and H data of the preferred-color pixels and the reference values of the C and H data of the preferred colors. If the preferred-color pixel is the skin-color pixel, the L data of the skin color is corrected using the correction function of the L data according to the average value of the L data and the L data of all the pixels is corrected by the L correction amount of the skin color. The corrected L', C' and H' data is inversely converted into R', G' and B' data and the R', G' and B' data is output to the timing controller 24.

The timing controller 24 aligns and outputs the R', G' and B data from the preferred-color corrector 22 to the panel driver 26 and generates control signals for controlling driving timings of the panel driver 26 to the panel driver 26.

The panel driver 26 includes a data driver for driving data lines of the liquid crystal panel 28 and a gate driver for driving gate lines. The data driver converts the R', G' and B' data from the timing controller 24 into analog data and outputs the analog data to the data lines of the liquid crystal panel 28. The gate driver sequentially drives the gate lines of the liquid crystal panel 28 in response to the control signals of the timing controller 24.

The liquid crystal panel 28 on which a plurality of pixels are arranged in a matrix displays the image. The pixels exhibits desired colors by a combination of red, green and blue sub-pixels of which light transmission is adjusted by changing the liquid crystal arrangement according to data signals. The sub-pixels charge difference voltages between the data signals supplied to pixel electrodes through thin-film transistors and a common voltage supplied to a common electrode so as to drive the liquid crystal. The liquid crystal panel 28 can display an image with excellent image quality with colors preferred by a person using the preferred-color corrector 22.

In the method and apparatus for correcting the preferred color and the liquid crystal display device according to the present invention, the preferred colors are corrected according to the differences between the color coordinate average values of the preferred-color pixels and the reference values of the colors preferred by the person so as to improve image quality with the colors preferred by the user. In addition, the average values of the input image are corrected to be close to the reference values of the preferred colors using the weighting function such that contour error can be prevented from occurring in the pixel boundary.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for correcting a preferred color, the method comprising:
    converting data of an input image into lightness (L), chroma (C) and hue (H) data;
    detecting a preferred-color pixel from the input image;
    calculating average values of the L, C and H data of the preferred-color pixel;
    correcting the C data of the preferred-color pixel according to a difference between the C average values of the corresponding preferred-color pixel and a predetermined C reference value of the corresponding preferred-color pixel;
    correcting the H data of the preferred-color pixel according to a difference between the H average values of the corresponding preferred-color pixel and a predetermined H reference value of the corresponding referred-color pixel;
    correcting the L data of the preferred-color pixel according to the L average value of the preferred-color pixel or not according to the hue of the preferred-color pixel; and
    inversely converting the corrected L, the corrected C and the corrected H data into image data according to the hue of the preferred-color pixel or inversely converting the non-corrected L, the corrected C and the corrected H data into image data according to the hue of the preferred-color pixel.

2. The method according to claim 1, wherein the detecting of the preferred-color pixel comprises:
    comparing the H data of the input pixel with a reference range of the H data of the preferred color and detecting a first preferred-color pixel; and
    performing a best linear estimation (BLE) operation of the first preferred-color pixel and detecting a second preferred-color pixel.

3. The method according to claim 2, wherein the detecting of the second preferred-color pixel comprises:
    calculating a preferred-color discrimination constant by a matrix product of an input matrix composed of characteristic data of the first preferred-color pixel and a weight vector matrix composed of weight vectors of the preferred color; and
    comparing the calculated preferred-color discrimination constant with a reference range of the preferred-color discrimination constant and detecting the second preferred-color pixel.

4. The method according to claim 3, wherein each of the correcting of the C and H data comprises:
    calculating a correction function for compensating for the differences between the C or H average value and the C or H reference value of the preferred-color pixel;
    calculating a weighting function for adjusting a peak value of the C or H average value of the preferred-color pixel;
    multiplying the correction function by the weighting function and calculating a final correction function;
    calculating correction amounts of the C or H data of the preferred-color pixel using the final correction function; and
    compensating for the C or H data of the preferred-color pixel by the correction amounts.

5. The method according to claim 4, wherein the correcting of the L data is performed only if the hue of the preferred-color pixel is a skin-color.

6. The method according to claim 5, wherein the correcting of the L data of the skin-color pixel comprises:
    calculating an L correction function according to the L average value the skin-color pixel;
    calculating an L correction amount according to the L data using the L correction function; and
    compensating for the L data of the skin-color pixel by the L correction amount.

7. The method according to claim 6, further comprising compensating for the L data of all pixels of the input image by the L correction amount of the skin-color pixel.

8. The method according to claim 4, further comprising:
    calculating a secondary weighting function for decreasing the correction amount in a boundary of the preferred-color pixel using the preferred-color discrimination constant of the second preferred-color pixel used in the detecting of the preferred-color pixel; and
    multiplying the secondary weighting function by the final correction function.

9. An apparatus for correcting a preferred color, the apparatus comprising:
    a color coordinate converter which converts data of an input image into lightness (L), chroma (C) and hue (H) data;
    a preferred-color detector which detects a preferred-color pixel from the input image;
    an LCH average value calculator which calculates average values of the L, C and H data of the preferred-color pixel from the preferred-color detector;
    a preferred-color corrector which corrects the C data of the preferred-color pixel according to a difference between the C average of the corresponding preferred-color pixel and a predetermined C reference value of the corresponding preferred-color pixel, corrects the H data of the preferred-color pixel according to a difference between the H average values of the corresponding preferred-color pixel and a predetermined H reference value of the corresponding preferred-color pixel, and corrects the L data of the preferred-color pixel according to the L average value of the preferred-color pixel or not according to the hue of the preferred-color pixel; and
    a color coordinate inverse-converter which inversely converts the corrected L, the corrected C and the corrected H data from the preferred-color corrector into image data according to the hue of the preferred-color pixel or inversely converts the non-corrected L, the corrected C and the corrected H data into image data according to the hue of the preferred-color pixel.

10. The apparatus according to claim 9, wherein the preferred-color detector compares the H data from the color coordinate converter with a reference range of the H data of the preferred color so as to detect a first preferred-color pixel, calculates a preferred-color discrimination constant by a matrix product of an input matrix composed of characteristic data received from the color coordinate converter with respect to the first preferred-color pixel and a weight vector matrix composed of weight vectors of the preferred color, and compares the calculated preferred-color discrimination constant with a reference range of the preferred-color discrimination constant so as to detect the second preferred-color pixel.

11. The apparatus according to claim 10, wherein the preferred-color corrector calculates a correction function for compensating for the differences between the C and H average values and the C and H reference values and a weighting function for adjusting peak values of the C and H average values, multiplies the correction function by the weighting function so as to calculate a final correction function, calculating calculates correction amounts of the C and H data using the final correction function, and compensates for the C and H data by the correction amounts.

12. The apparatus according to claim 11, wherein the preferred-color corrector calculates an L correction function according to the L average value of the skin-color pixel, calculates an L correction amount according to the L data using the calculated L correction function, and compensates for the L data of the skin-color pixel by the L correction amount, if the second preferred-color pixel is a skin-color pixel.

13. The apparatus according to claim 12, wherein the preferred-color corrector compensates for the L data of all pixels of the input image by the L correction amount of the skin-color pixel.

14. The apparatus according to claim 11, wherein the preferred-color corrector calculates a secondary weighting function for decreasing the correction amount in a boundary of the preferred-color pixel using the preferred-color discrimination constant of the second preferred-color pixel used in the preferred-color detector, and multiplying the calculated secondary weighting function by the final correction function.

15. A liquid crystal display device which displays the image data output from the apparatus for correcting the preferred color according to any one of claims 9 to 14 on a liquid crystal panel.

\* \* \* \* \*